Patented Apr. 3, 1951

2,546,959

UNITED STATES PATENT OFFICE 2,546,959

2-AMINO-4-HYDROXY-6-(HYDROXY-METHYL)-PTERIDINE

Hans Spiegelberg, Basel, Switzerland, assignor to Hoffmann-La Roche Inc., Nutley, N. J., a corporation of New Jersey No Drawing. Application May 8, 1947, Serial No. 746,866. In Switzerland September 24, 1946

5 Claims. (Cl. 260—251.5)

This invention relates to a process for the manufacture of a new pteridine derivative, more especially of 2-amino-4-hydroxy-6-(hydroxymethyl)-pteridine having the formula

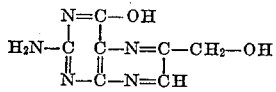

It has been found, according to the present invention, that 2-amino-4-hydroxy-6-(hydroxymethyl)-pteridine can be obtained readily and in good yield by reacting dihydroxyacetone in weakly acid solution, in the presence of hydrazine, with 2,4,5-triamino-6-hydroxy-pyrimidine. The condensation process is accelerated by the presence of boric acid.

2 - amino - 4 - hydroxy - 6 - (hydroxymethyl) - pteridine is a microcrystalline, light yellow powder which sinters, while decomposing, at a temperature above 300° C. It is very slightly soluble in water and in the usual solvents and may be used as an intermediate for the preparation of folic acid.

The following examples are illustrative of the present invention.

Example 1

20.56 parts by weight of 2,4,5-triamino-6-hydroxy - pyrimidinesulfate ($C_4H_7ON_5.H_2SO_4.H_2O$), 22 parts by weight of crystallised sodiumacetate ($3H_2O$) and 5 parts by weight of glacial acetic acid are stirred up in 100 parts of water and heated to 90° C. In the couse of 2 hours a solution of 10 parts by weight of dihydroxyacetone in 40 parts of water and a solution of 4 parts by weight of hydrazinehydrate in 45 parts of water are added dropwise, simultaneously at the same rate. The air in the reaction vessel is driven out, preferably by means of an inert gas, such as, for instance, carbon dioxide or nitrogen, in order to prevent oxidation of the 2,4,5-triamino-6-hydroxy-pyrimidine. After termination of the dropwise addition of the two solutions, stirring at the temperature given above is continued for a further 15 minutes, whereupon, when still hot, the difficultly soluble 2-amino-4-hydroxy-6-(hydroxymethyl)-peteridine is filtered off. It is washed with water, alcohol and ether. After drying in vacuo at 50° C. it is practically pure. The yield amounts to 9.3 parts by weight. A completely pure compound is obtained on recrystallizing 1 part by weight of the 2-amino-4-hydroxy-6-(hydroxymethyl)-pteridine thus obtained from 1000 parts of water.

Example 2

2 parts by weight of dihydroxyacetone, 1.2 parts by weight of glacial acetic acid, 2.5 parts by weight of boric acid, 5.14 parts by weight of 2,4,5-triamino-6-hydroxy - pyrimidinesulfate, 5.4 parts by weight of crystallised sodium-acetate ($3H_2O$), 1 part by weight of hydrazinehydrate and 50 parts of water are heated, under exclusion of air and while stirring, to 85° C. for 30 minutes. The 2-amino-4-hydroxy - 6 - (hydroxymethyl)-pteridine (1.55 parts by weight) thus obtained is worked up in accordance with Example 1.

I claim:

1. Process for the manufacture of 2-amino-4-hydroxy-6-(hydroxymethyl)-pteridine, comprising reacting dihydroxy acetone with 2,4,5-triamino-6-hydroxy-pyrimidine in the presence of hydrazine.

2. Process in accordance with claim 1, comprising carrying out the reaction in weakly acid solution.

3. Process in accordance with claim 2, comprising carrying out the reaction in the presence of boric acid.

4. 2-amino- 4 -hydroxy - 6 - (hydroxymethyl)-pteridine.

5. The method which includes: subjecting 2,4,5-triamino-6-hydroxy-pyrimidine to the action of dihydroxyacetone in a solvent therefor; and separating 2-amino-4-hydroxy-6-(hydroxymethyl)-peteridine from the reaction mixture.

HANS SPIEGELBERG.

No references cited.